United States Patent [19]

Lowe

[11] 4,382,451

[45] May 10, 1983

[54] ELECTRONIC VALVE ASSEMBLY FOR GLASSWARE FORMING MACHINERY

[75] Inventor: Earl L. Lowe, Winchester, Ind.

[73] Assignee: Ball Corporation, Muncie, Ind.

[21] Appl. No.: 370,311

[22] Filed: Apr. 21, 1982

Related U.S. Application Data

[63] Continuation of Ser. No. 242,313, Mar. 9, 1981, abandoned, which is a continuation of Ser. No. 12,862, Feb. 16, 1979, abandoned.

[51] Int. Cl.³ ............................................. F15B 13/08
[52] U.S. Cl. ................................ 137/596.16; 137/884; 137/885
[58] Field of Search ..................... 137/596.16, 884, 885

[56] References Cited

U.S. PATENT DOCUMENTS

| | | | |
|---|---|---|---|
| 1,849,044 | 3/1932 | Summey | 137/625.65 UX |
| 3,918,489 | 11/1975 | Foster | 137/884 |
| 4,082,108 | 4/1978 | Dininio | 137/596.16 x |
| 4,100,937 | 7/1978 | Mallory | 137/596.16 |

OTHER PUBLICATIONS

Maul Bros. Inc. Brochure.

*Primary Examiner*—Gerald A. Michalsky
*Attorney, Agent, or Firm*—Gilbert E. Alberding

[57] ABSTRACT

An electronic valve block assembly for controlling the operation of glassware forming machinery. A selector mechanism is utilized to couple either a high pressure plenum or a low pressure plenum to the input port of a solenoid operated valve. A pressure regulator is interjected between the selector mechanism and the valve to finely control the pressure, providing ample flow of output air over a wide range of pressures. A preferred embodiment of pressure regulator is described. Also described is an adapter plate for making the valve block compatible with varying IS machine manifold configurations.

11 Claims, 6 Drawing Figures

ELECTRONIC VALVE ASSEMBLY FOR GLASSWARE FORMING MACHINERY

This is a continuation of application Ser. No. 242,313 filed Mar. 9, 1981, now abandoned, which in turn is a continuation of application Ser. No. 12,862 filed Feb. 16, 1979, now abandoned.

BACKGROUND OF THE INVENTION

The present invention relates to valve assemblies and, in particular, to an electronic valve block assembly for controlling the operation of glassware forming machinery.

Glassware forming machines typically comprise a plurality of individual sections (IS) cooperating to receive, in ordered sequence, gobs of molten glass from a single source. Each individual section (IS) of the glassware forming machine itself includes a plurality of pneumatically operated elements. The relative operating sequence of the respective elements of each IS machine is controlled through selective actuation of an associated valve typically disposed in a valve block. There are typically 19 or 21 separate valves utilized in the control of the complete glassware forming sequence.

The actuation of the valves in the block has typically been effected by a mechanical timing drum driven in synchronism with the gob feeding mechanism. Respective projecting cam members are disposed in annular grooves in the drum surface and mechanically cooperate with the valves to effect activation and deactivation. Relative timing between events in the machine cycle are adjusted by the relative position of the respective cam members in the annular grooves. For a basic description of such a glassware forming machine, reference is made to U.S. Pat. No. 1,911,119 issued May 23, 1933 to H. W. Ingle.

Electronic sequencing of the respective elements of the glassware forming machine is now emerging. For a description of electronically controlled glassware forming machinery, reference is made to U.S. Pat. Nos. 3,762,907, issued Oct. 2, 1973 to Quinn and Kwaitkowski and Re. 29,642, reissued May 23, 1978 to Kwaitkowski and Wood (both commonly assigned with the present application). Briefly, in electronically controlled glassware forming machines, actuation signals are generated by an electronic controller to selectively actuate or deactivate solenoid operated valves, or the like, to effect timed operation of the respective glassware forming machine elements. The actuation signals are generated in synchronism with the machine cycle as defined by the molten glass gob feeder.

Typical solenoid controlled valve blocks are described in U.S. Pat. Nos. 3,918,489 issued Nov. 11, 1975 to Foster et al. and 3,982,726 issued Sept. 28, 1976 to Bublitz et al. It is noted that in electronic valve blocks, the space required by the valves within the valve block must be minimized in order to incorporate all of the 19 or more pneumatic valves into the valve block.

In addition, the compactness requisites for the valve block are magnified by a need for plural air pressures for operation of the IS machine in various modes. Conventional electronic valve blocks have required external plumbing to provide the various air pressures as required. Accordingly, when the machine is converted for production of different types of bottles, (i.e., job change) replumbing of the machine is often required. Job changes on IS machines can occur as frequently as on a less than weekly basis. As can readily be appreciated, the replumbing of the machine can be very costly in terms of production downtime.

Mitigating against the need for compact valves is the necessity of ample air flow to maintain the operational speeds of the IS elements. Also, mitigating against compact valves is the desirability to be able to operate the IS machine functions with unfiltered air. In the typical operation of the IS machine, various condensations, cylinder oil, sludge and varnish from the compressor, and the like, tend to find its way into the air lines. The foreign materials often play havoc with close tolerance orifices in the valves. As can readily be appreciated, installation of additional filtering apparatus, and frequent cleaning or change of the filters entails substantial costs.

An additional problem has arisen with the conventional electronic valve block in that the malfunction of a single valve can often necessitate the removal of the entire valve block to effect repairs requiring the IS machine to shut down for lengthy periods.

In addition, the conventional electronic valve block provides the actuating air at output ports which must mate with a manifold (kiss plate) to the glassware forming machine. However, the spatial configuration of the manifold inputs vary on the various types and models of glassware forming machines. Accordingly, special plumbing must be provided to couple the output ports of the conventional electronic valve block to the manifold of different IS machines.

SUMMARY OF THE INVENTION

The present invention provides an electronic valve block of compact structure permitting disposition of 19 or more valves for complete control of the IS machine operation. A plurality of solenoid air pilot operated valves are each formed as respective units and are removably attached to the block body to provide for ready access to the individual valves without necessity of disassembling or removing the valve block.

Plural operating pressures are provided through use of selector mechanisms incorporated into the valve block. Separate plenum chambers adapted for communication with high and low pressure sources, respectively, are included in the valve block. The selector mechanism selectively couples one of the plenums to the input port of an associated solenoid operated valve. The selector mechanism can also cut off all air flow to the valve. Ample air flow over wide ranges of pressures can be provided by further incorporation of a pressure regulator cooperating with the selector mechanism. In accordance with one aspect of the invention, a pressure regulator is utilized which provides high flow capacity, is relatively tolerant of air contaminants and not susceptible to clogging, while at the same time requires a minimum of space within the valve block.

An inexpensive adapter plate is utilized for providing a match to the machine manifolds of various types and models of IS machines. Holes are bored through the plate at positions corresponding to the inlet ports of the IS machine manifold kissplate. Air channels are formed in one surface of the plate to provide communication between the holes and the appropriate valve block outlet ports.

BRIEF DESCRIPTION OF THE DRAWING

A preferred exemplary embodiment of the present invention will hereinafter be disclosed in conjunction with the appended drawings wherein like numerals denote like elements and.

DETAILED DESCRIPTION OF THE PREFERRED EXEMPLARY EMBODIMENT

Figure 1:
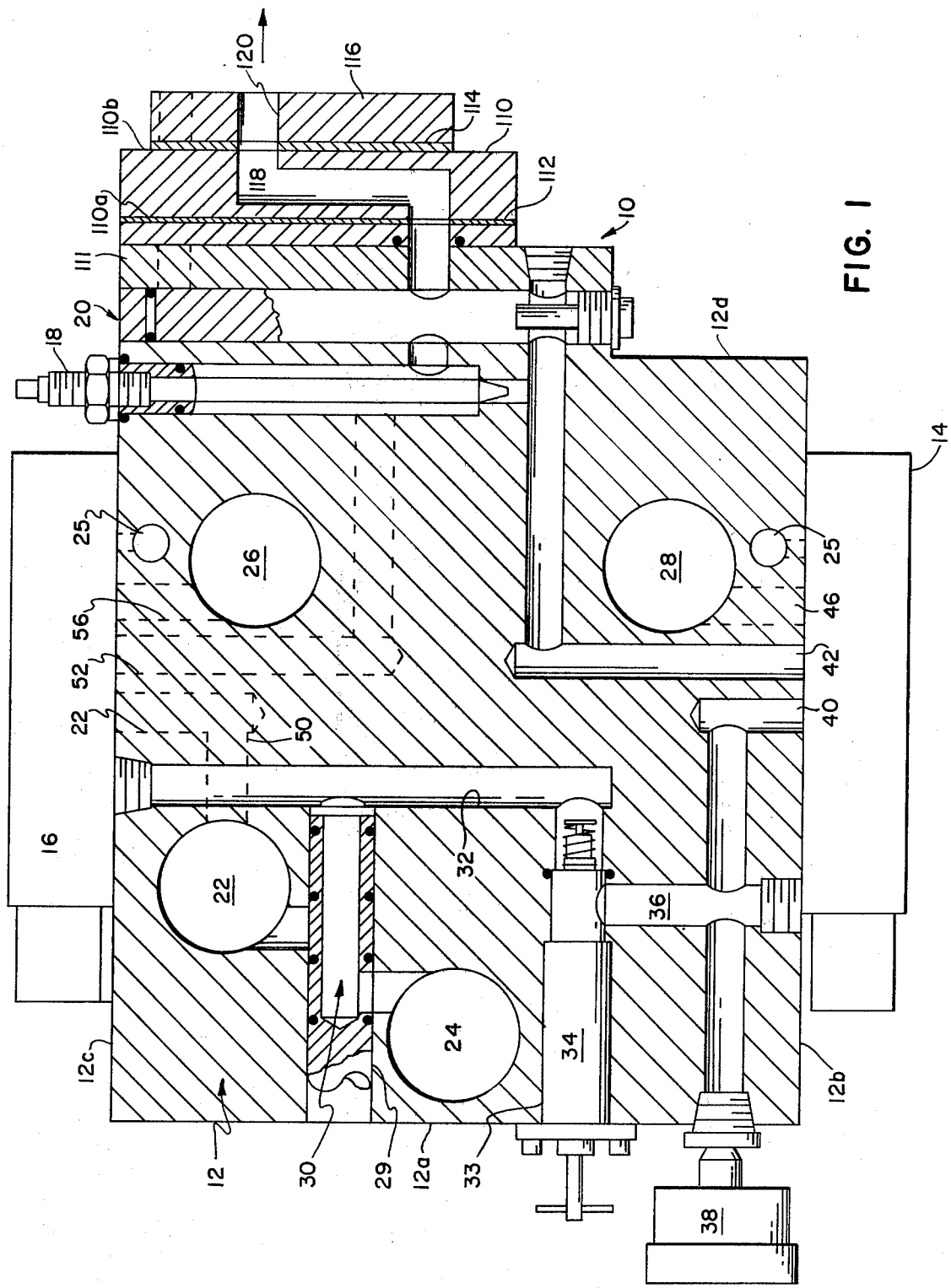
FIG. 1 is a cross-sectional view of a preferred exemplary embodiment of a valve block in accordance with the present invention.

Referring now to FIG. 1, the preferred exemplary embodiment of a valve block in accordance with the present invention is generally designated as 10. Valve block 10 comprises a body block 12 having respective surfaces 12a, 12b, 12c and 12d. A plurality of conventional internal air pilot solenoid operated valves 14, are disposed in a row along surface 12d of the block, communicating with respective ports in the valve block surface as will be explained. Similarly, a further plurality of conventional internal air pilot solenoid operated valves are disposed in a row along the upper surface 12c of body block 12. When valve block 10 is adapted for use with an IS machine, eleven valves are typically disposed on surface 12b and ten valves on surface 12c. Valves 14 and 16 are suitably of the spool or poppet type, although other valve types may be utilized. Orifice sizes of valves 14 and 16 are chosen to provide ample air flow. A plurality of needle valves 18, one associated with each solenoid valve 14 or 16, are disposed in bores along a row in the upper surface 12c of body block 12. A row of bores for receiving either spring or ball check valves 20 are also disposed in surface 12c of body block 12. As will hereinafter be explained, use of a ball check valve 20 provides for rapid actuation and metered exhaust and use of spring check valve 20 provides for metered actuation and rapid exhaust. A low pressure plenum 22, a high pressure plenum 24, a filtered pilot air plenum 25 and respective exhaust plenums 26 and 28 are formed in body block 12. If desired, a single exhaust plenum can be utilized. Plenums 22, 24, 25, 26 and 28 are suitably all formed in body block 12 running parallel to surfaces 12b and 12c and generally perpendicular to the rows of solenoid valves.

Channels are provided between low pressure plenum 22 and high pressure plenum 24 into respective bores 29 in surface 12a adapted for receiving selector mechanisms 30. Bores 29 extend inwardly in a direction generally perpendicular to surface 12a. Each bore 29 communicates with an air passageway 32 formed in body block 12; extending in a direction generally parallel to surface 12a. As will hereinafter be explained, selector mechanisms 30 selectively effect a passage between either the low pressure plenum 22 or high pressure plenum 24 and air passageway 32, or operates to block flow of pressurized air to the passageway.

Each selector mechanism 30 and communicating passageway 32 is associated with a particular solenoid valve 14. Each air passage 32 communicates with a respective second bore 33 extending inwards generally perpendicular from surface 12a of body block 12. Each bore 33 receives a pressure regulator 34. Regulated air from each pressure regulator 34 is provided through an associated air passage 36 to an associated pressure gauge 38 and to the input port 40 of the associated solenoid valve 14.

A respective air passageway 42 is provided, extending generally perpendicularly from surface 12b of body 12 in registry with the output port of each solenoid valve 14. Each passageway 42 communicates through an associated needle valve 18 and spring or ball check valve 20, with a corresponding valve block output port 44.

Respective exhaust passageways 46 are provided in block 12 extending perpendicularly from surface 12b. Each exhaust passageway is disposed in registry with the exhaust port of an associated solenoid valve 14 and communicates with exhaust plenum 28. Filtered pilot air is also provided to each valve 14 through pilot air plenum 48.

An example operation of valve block 10 will now be provided with respect to a given valve 14. In the following description, it should be appreciated that the referenced elements and passageways are those associated with that particular valve 14. As will hereinafter be explained in more detail, selector mechanism 30 provides either high or low pressure air to air passageway 32. Air pressure is then brought to a desired level through pressure regulator 34 (as will hereinafter be explained) and applied to the input of solenoid operated valve 14. Solenoid operated valve 14 operates to selectively couple input passageway 40 to output passageway 42 or to couple output passageway 42 to exhaust passageway 46, in accordance with the state of the solenoid. Valve 14 can be either normally open or normally closed. Assuming the given valve 14 to be normally closed, when the solenoid is actuated by the electronic controller (not shown), a passage is effected between input passageway 40 and output passageway 42. Thus, air at the regulated pressure is passed through output passageway 42 to the associated needle valve 18 and ball or spring check valve 20. If a ball check valve 20 is used, air will be passed through needle valve 18 and (rapidly) through ball check valve 20 to the valve block output port 44. If a spring check valve 20 is utilized, the air will be passed to output port 44 at a metered rate through needle valve 18.

When the solenoid is deactivated, communication is established between output passageway 42 and exhaust passageway 46. Accordingly, if a ball check valve 20 is utilized, return of exhaust air from the IS machine element will be passed at a metered rate through needle valve 18 through output passageway 42, and exhaust passageway 46 to exhaust plenum 28. If a spring check is utilized, the majority of the air will be passed rapidly through the spring check 20.

Various elements of the typical IS machine consistently operate at a single, e.g., low, pressure. Accordingly, valve block 10 need only be adapted to supply a single air pressure to those particular elements, and the solenoid operated air valves associated with those elements may be directly coupled to one of the pressure sources. Accordingly, the input ports of solenoid operated valves 16, communicate with the low pressure plenum 22 through respective passageways 50. Respective output passageways 52 are also provided in body 12, coupling the output port of the valve 16 with associated needle valves 18 and spring or ball check valves 20 and therethrough to an associated output port 54. Similarly, exhaust passageways 56 communicate between the exhaust port of each valve 16 and exhaust plenum 26. Filtered pilot air is also provided to each valve 16 through plenum 48. The operation of air valves 16 is entirely analogous to the operation of valves 14 except that the output air is provided at a single fixed pressure.

Figure 2C:
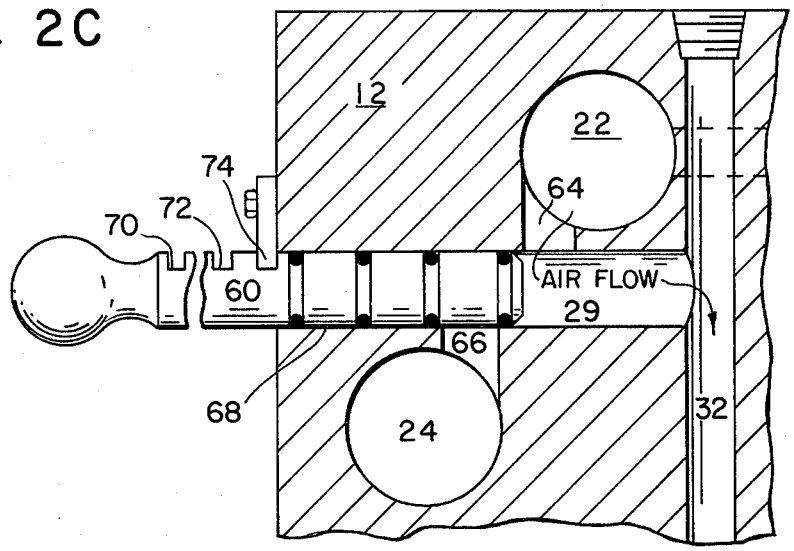
FIGS. 2a, 2b and 2c are cross-sectional illustrations of various states of the selector mechanism shown in FIG. 1.
Figure 2A:
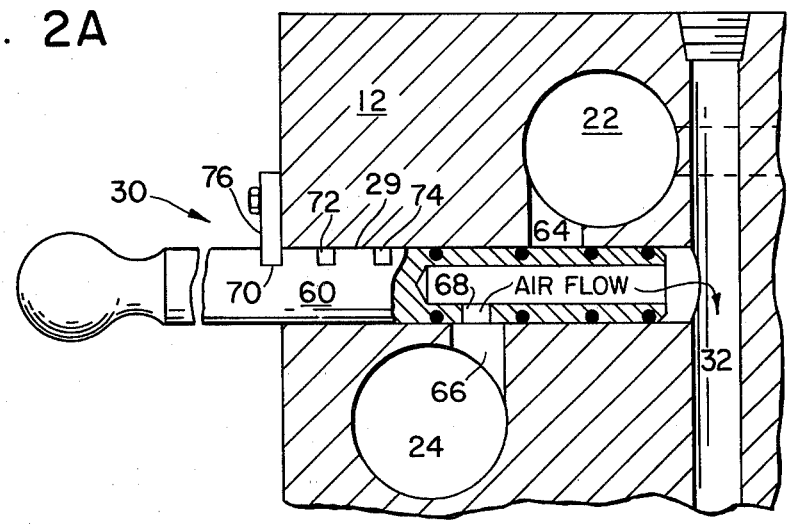
Figure 2B:
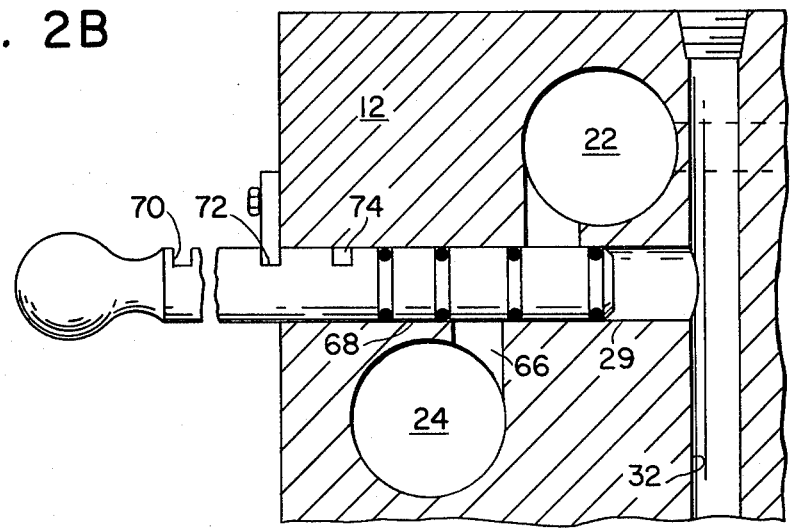

The use of separate low pressure and high pressure plenums in cooperation with selector mechanism 30 and pressure regulator 34 provides for ample air flow over an extremely wide range of operating air pressures. As noted above, selector mechanism 30 selectively couples low pressure plenum 22 or high pressure plenum 24 to the pressure regulator 34, expanding the operating range of pressures available. In addition, selector mechanism 30 also provides for cutting off air flow to the regulator. With reference now to FIGS. 2a, 2b and 2c, the structure and operation of a given selector mechanism 30 will be described. Again, in the following description, it should be appreciated that the referenced elements and passageways are those associated with the particular exemplary selector mechanism.

Selector mechanism 30 comprises a hollow cylinder 60 slidably received in bore 29 in surface 12a of block 12. Bore 29 communicates with both low pressure plenum 22 and high pressure plenum 24 through respective passageways 64 and 66. Passageways 64 and 66 are offset with respect to each other in the axial direction of bore 62. An aperture 68 is provided for selective registry with passageway 66 from high pressure plenum 24.

Cylinder 60 is, in effect, divided into three operative areas, corresponding to the three states or positions assumed. Respective notches 70, 72 and 74 are provided in positions corresponding to the respective desired states. A latching device 76 is included for cooperation with the notches to maintain the cylinder 60 in the desired position when under pressure and to ensure that the pressure from the plenums does not propel cylinder 60 out of block 12. In practice, an automatic mechanism for controlling the state, suitably under the auspices of the glassware forming machine controller would be utilized. For example, cylinder 60 would be adapted to cooperate with a worm screw or lead screw to effect the positioning of the cylinder within bore 62. Similar mechanisms can also be used for manual operation rather than the simple notches and key latch shown in the drawing.

FIG. 2a shows cylinder 60 in a first state whereby aperture 68 is in registry with the passageway 66 from high pressure plenum 24. Accordingly, high pressure air is provided from plenum 24 through aperture 68 and passed through the hollow interior of cylinder 60 to passageway 32. The upper wall of cylinder 60 effectively blocks passageway 64 from low pressure plenum 22. O-rings are suitably provided for sealing. The O-rings may be either disposed on cylinder 60 or incorporated into body block 12, or within appropriate sleeving.

A second state whereby both low and high pressure plenums are blocked by the exterior wall of cylinder 60 is illustrated in FIG. 2b. Again, O-rings are provided for appropriate sealing.

The third state wherein the low pressure plenum 22 is coupled to passageway 32 is shown in FIG. 2c. In this instance, cylinder 60 is withdrawn until notch 74 is in registry with latch 76. High pressure source 24 is blocked off by the wall of cylinder 60. Here again, sealing is provided by appropriately disposed O-rings. Low pressure source 22 thus communicates through passageway 64 and bore 29 with passageway 32.

It should be appreciated that the inclusion of the off state provides a safeguard against spurious operation of solenoid valves. In addition, the off state allows for removal of a single pressure regulator, pressure gauge or air valve without denigrating the pressure characteristics of the entire valve block. In addition, the off state provides an additional safety factor against leakage of various cutoff valves. This safety factor can be particularly important when replacing pressure regulators, pressure gauges or the solenoid valves.

Fine adjustment of the selected high or low pressure is provided by pressure regulator 34. The pressure regulator must be of relatively small dimensions to facilitate disposition of a large number of regulated pressure valves in the valve block. It is desirable that a minimum of eight regulated valves be provided to facilitate typical job changes and for fine tuning of the IS machine for maximum production. At the same time, it is necessary that the pressure regulator operate without providing too great a detriment to the air flow and be tolerant of the air contaminants found in unfiltered air.

Figure 3:
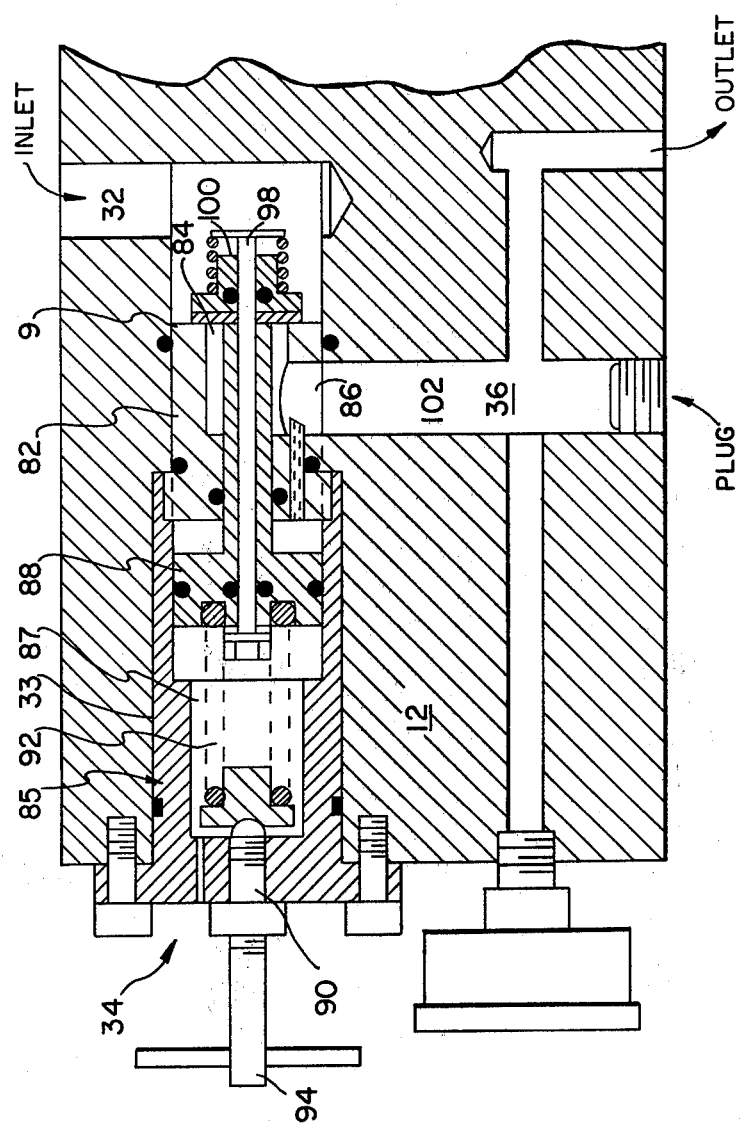
FIG. 3 is a cross-sectional view of a preferred exemplary embodiment of a pressure regulator in accordance with another aspect of the present invention.

A preferred embodiment of a pressure regulator 34 having these characteristics is shown in FIG. 3. It should be appreciated that the passageways and elements referenced in the following discussion are those associated with a given regulator 34. Cylindrical bore 33 is provided in body block 12 extending perpendicularly from surface 12a communicating with passageways 32 and 36. Pressure regulator 34 is received in cylindrical bore 33 and secured to body block 12 through suitable fasteners such as bolts. Passageways 32 and 36 are offset relative each other along the axial direction of bore 33. A poppet valve seat 82 is disposed within the cylindrical bore 33. Seat 82 includes an axial cavity 84 communicating with an aperture 86 disposed in registry with air passageway 36. In practice, seat 82 is removably affixed to a sleeve 85 including a flange through which the regulator 34 is secured to body block 12.

Sleeve 85 includes an axial chamber 87 for slidably receiving a piston 88. A small escape aperture is forward of piston 88 and is provided in chamber 87. An adjustable tension spring mechanism 90 is utilized in cooperation with the piston. A spring 92 abuts piston 88 at one end and a screw 94 journalled through sleeve 85 at the other. The screw tensioning mechanism controls the inward pressure on piston 88. Piston 88 includes a stem 96 slidably disposed through a central axial bore in seat 82. Disposed within stem 96 is a shaft 98. Shaft 98 is secured at the piston end with a suitable retainer and has a poppet structure 100 disposed on its other end for cooperation with seat 82. In various circumstances, it may be advantageous to dispose the poppet 100 directly on piston stem 96, omitting the interior shaft 98.

An aspirator 102 is journalled through seat 82 to provide pressure to the piston chamber 87 at the rear of piston 88. Aspirator 102 may be disposed anywhere through the valve seat. However, a tapered end is desirable to create eddy currents to prevent air contamination from clogging the aspirator.

The pressure is controlled by adjusting the tension on spring 92. Piston 88 slides in seat 82, displacing poppet 100 from seat 82. The relative displacement of the poppet 100 and seat 82 is established in an equilibrium position when the pressure provided through aspirator 102 is essentially equal to that provided against the pressure by spring 92. Accordingly, the pressure provided in air passageway 36 is controlled by adjusting spring 92. It should be appreciated that the central cavity of poppet seat 82 and the aperture 86 are both relatively large diameter, approximately equal to the diameter of the air passageways 32 and 36, thus presenting relatively little restriction to flow. Further, the flow of air through regulator 34 is relatively unconvoluted as compared with conventional pressure regulators.

It should also be appreciated that by providing the option of a lower pressure supply, the lower pressures can be attained with less restriction to flow by providing greater displacement of the poppet from seat 82.

The very simplicity of pressure regulator 34 in terms of numbers of parts, is in and of itself, a great advantage with respect to machine maintainence and costs. If for some reason a given pressure regulator fails, a replacement can be effected in a matter of a few minutes by cutting off pressure to the regulator with selector 30, unbolting the two bolts securing the faulty regulator to the block body 12, removing the faulty regulator, inserting a replacement and securing the replacement through the two securing bolts.

It should also be appreciated that filtered air is not required for the operation of regulator 34. The air flow through the regulator is relatively open and unconvoluted and is thus not susceptible to clogging. The eddy currents produced by the tapered end of aspirator 102 prevents clogging of the aspirator. Contaminants are not a problem with the generation of the adjusting pressure, since that pressure is provided through spring mechanism 90, and thus does not entail the use of any pressurized air. It should be appreciated that appropriate O-rings are provided for sealing.

Referring again to FIG. 1, as noted above, the respective valves 14 and respective valves 16 communicate with valve block output ports 44 and 54. The output ports 44 and 54 must then be matched with the proper inlet ports of the IS machine manifold kissplate. In the past, the valve blocks have been specially configured for a particular model IS, or tubing is bent to provide the proper matching. Other valve blocks have utilized relatively large blocks of metal with holes bored therethrough at angles to provide proper matching. The tubing and bored block methods, however, both tend to be bulky and are expensive in space consumed, cost to manufacture, and/or installation costs.

Figure 4:
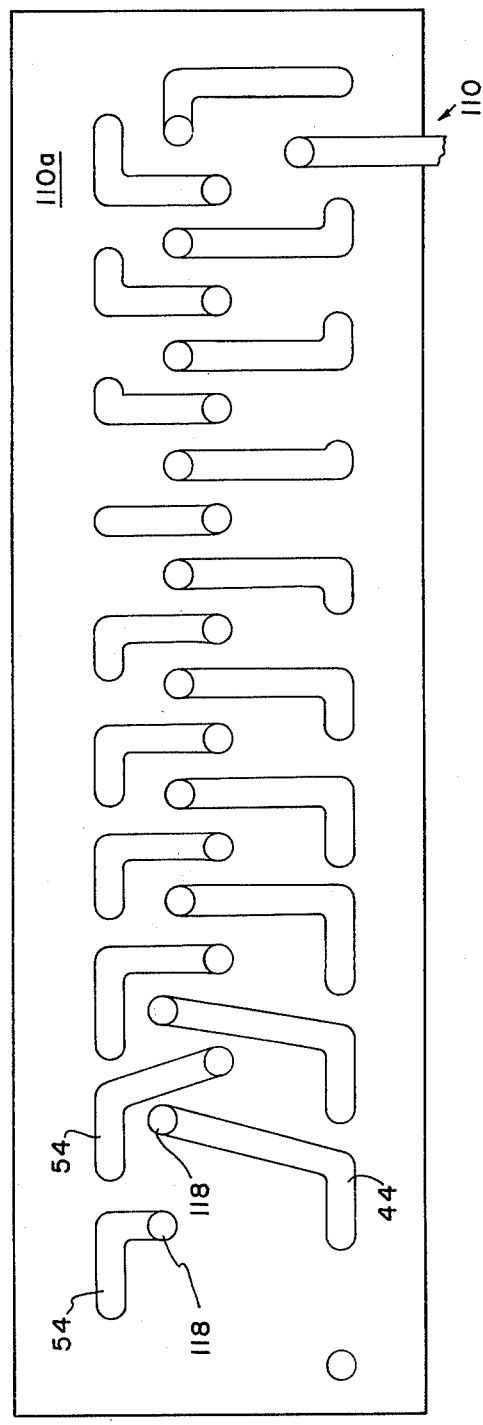
FIG. 4 is a front planar view of an adapter plate in accordance with another aspect of the present invention.

In accordance with one aspect of the present invention, a particularly advantageous adapter plate 110 is provided. Adapter plate 110 is shown in FIGS. 1 and 4. Adapter plate 110 has a first surface 110a secured with an intervening gasket 112 against surface 12d of body block 12. A second opposing surface surface 110b is adapted to be secured, along with an appropriate gasket 114, against the kissplate 116 of the IS machine manifold. The kissplate is coupled to the respective IS machine elements through copper tubing, pipe, or the like (not shown). A plurality of holes 118 are formed through adapter plate 110 at relative positions to provide registry with the kissplate input ports 120. A channel is formed, suitably by milling or casting, in surface 110a of adapter plate 110 running from hole 118 to the desired valve block output port 44. It should be appreciated that similar channels and holes are utilized to provide communication between valve block output ports 54 and kissplate ports 120 as well, but are omitted in FIG. 1 for ease of illustration.

It should be appreciated that adapter plate 110 can be utilized to adapt valve block 10 to any IS machine kissplate configuration, without requiring varying thicknesses of adapters, expensive forming techniques, or time consuming plumbing. Further, adapter 110 can be readily changed to change solenoid/element assignments, if desired, without requiring the time consuming replumbing from the manifold kissplate to the IS machine elements. Thus, a single standardized valve block output port configuration can be used and, through adapter plate 110, made compatible with any kissplate input port configuration.

It should be appreciated from the foregoing that the present invention provides a particularly advantageous electronic valve block. The valve block is compact yet can provide ample flow of output air over a wide range of pressures, and is tolerant of air contaminants. In addition, the configuration of the valve block is such that the respective valves and pressure regulators in the block can be removed for service without necessitating dismantling or removal of the entire valve block. Further, the valve block is made compatible with any IS machine manifold configuration through the use of an inexpensive and compact adapter plate.

It will be understood that the above description is of illustrative embodiments of the present invention and the invention is not limited to the specific form shown. For example, while the valve block is described in the context of a glassware forming machine, it may readily be adapted for use with any electronically controlled, hydraulically operated apparatus. Similarly, it may be desirable to locate all of the pressure gauges 38 in a remote bank. This and other modifications may be made in the design and arrangement of the elements without departing from the spirit of the invention, as expressed in the appended claims.

What is claimed is:

1. In a valve block for an IS glassware forming machine including a plurality of output ports and means for coupling the output ports to an IS machine manifold, said manifold including inlet ports associated with respective machine elements, said ports being in predetermined relative spatial disposition, the improvement wherein:
    said means for coupling the valve block output ports to the manifold comprises:
    a plate having first and second principal surfaces, one principal surface being adapted to mate with said valve block, and the other principal surface being adapted to mate with said manifold;
    apertures formed through said plate disposed at positions corresponding to the disposition of one of said manifold inlet ports and said valve block output ports; and
    channels formed on and extending along said plate first principal surface, disposed for coupling said aperture to one of an associated valve block output port and an associated manifold inlet port; and
    the further improvement wherein said valve block comprises:
    a body;
    a first plenum, formed in said body, and adapted for cooperation with a source of fluid at a first pressure;

a second plenum, formed in said body and adapted for cooperation with a source of fluid at a second pressure;

an exhaust plenum, formed in said body, and adapted for providing an exhaust from said valve block;

at least one first fluid passageway formed in said body and communicating with an associated first port in a first external surface of said body;

at least one second fluid passageway formed in said body, communicating between an associated second port in said body first external surface and an associated valve block output port adapted for connection to a respective machine element;

at least one third fluid passageway, formed in said body, communicating between an associated third port in said body first external surface and said exhaust plenum;

at least one valve means removably secured to said body first external surface, for selectively effecting fluid communication between said associated first port and said associated second port and for selectively effecting fluid communication between said associated second port and said associated third port;

at least one bore, formed in said body, extending from an external surface of said body and communicating with an associated first fluid passageway;

at least one fourth fluid passageway communicating between said first plenum and said bore;

at least one fifth fluid passageway communicating between said second plenum and said bore; and selector means, received in said bore, for selectively effecting a passage between said first plenum and said first passageway and selectively effecting a passage between said second plenum and said first passageway.

2. The valve block of claim 1 wherein said fourth fluid passageway and fifth fluid passageway are offset with respect to each other in the axial direction of said bore;

said selector means comprises a member slidably received in said bore, said member having outer walls conforming to said bore, said member including a member passageway formed therein communicating between the interior end of said member and an orifice in the wall of said member, said orifice being disposed for selective registry with said fifth passageway, whereby the relative axial position of said member in said bore, controllably effects one of at least two states;

one state being such that said orifice is in registry with said fifth passageway to provide a fluid path from said second plenum through said orifice and member passageway to said first fluid passageway; said fourth passageway is sealed by said member outer wall; and a second state being such that a fluid passageway is provided between said first plenum through said fourth passageway and said bore to said first passageway.

3. The valve block of claim 2 wherein said member further comprises means for sealing both said fourth and fifth passageways from said bore.

4. The valve block of claim 1 further including at least one second bore formed in said body extending from an external surface of said body and communicating with an associated first fluid passageway; and pressure regulator means, removably received in said bore, for regulating the pressure in said first passageway.

5. The valve block of claim 4 wherein said first passageway includes first and second legs, said first and second legs being offset with respect to each other in the axial direction of said second bore, and said pressure regulator comprises:

a sleeve, adapted for securing to said body, having a central hollow chamber therein;

a seat coupled to said sleeve, and having an axial cavity formed therein, and an aperture communicating with said axial cavity, and extending through one wall thereof, said seat being adapted for reception in said second bore with said axial cavity opening toward said first leg of said first fluid passageway, and said aperture in registry with said first fluid passageway second leg;

a piston slidably disposed within said sleeve central chamber, said piston having an associated stem affixed thereto slidably journalled through said seat;

a poppet structure coupled to said piston stem, and adapted for cooperation with said seat axial cavity;

aspirator means extending through said seat for providing fluid communication between said seat axial cavity; and spring loaded tensioning means disposed in said central cavity abutting against said piston on the side opposite from said seat for adjustably providing a pressure against said piston to effect a displacement of said poppet from said seat.

6. In a valve block for an IS glassware forming machine including a plurality of output ports and means for coupling the output ports to an IS machine manifold, said manifold including inlet ports associated with respective machine elements, said ports being in predetermined relative spatial disposition, the improvement wherein said means for coupling the valve block output ports to the manifold comprises:

a plate having first and second principal surfaces, one principal surface being adapted to mate with said valve block, and the other principal surface being adapted to mate with said manifold;

apertures formed through said plate disposed at positions corresponding to the disposition of one of said manifold inlet ports and said valve block output ports; and channels formed on and extending along said plate first principal surface, disposed for coupling said aperture to one of an associated valve block output port and an associated manifold inlet port; and the further improvement wherein said valve block comprises:

a body;

a first plenum, formed in said body, and adapted for cooperation with a source of fluid at a first pressure;

an exhaust plenum, formed in said body, and adapted for providing an exhaust from said valve block;

at least one first fluid passageway formed in said body and communicating with an associated first port in a first external surface of said body;

at least one second fluid passageway formed in said body, communicating between an associated second port in said body first external surface and an associated valve block output port adapted for connection to a respective machine element;

at least one third fluid passageway, formed in said body, communicating between an associated third port in said body first external surface and said exhaust plenum;

at least one valve means, removably secured to said body first external surface, for selectively effecting fluid communication between said associated first port and said associated second port and for selectively effecting fluid communication between said associated second port and said associated third port;

at least one bore, formed in said body, extending from an external surface of said body and communicating with an associated first fluid passageway; and said first passageway including first and second legs, said first and second legs being offset with respect to each other in the axial direction of said second bore; and pressure regulator means removably received in said bore, for controlling the pressure in said first passageway.

7. The valve block of claim 6 wherein said pressure regulator comprises:

a sleeve, adapted for securing to said body, having a central hollow chamber therein;

a seat coupled to said sleeve, and having an axial cavity formed therein, and an aperture communicating with said axial cavity, and extending through one wall thereof, said seat being adapted for reception in said second bore with said axial cavity opening toward said first leg of said first fluid passageway, and said aperture in registry with said first fluid passageway second leg;

a piston slidably disposed within said sleeve central chamber, said piston having an associated stem affixed thereto slidably journalled through said seat;

a poppet structure coupled to said piston stem, and adapted for cooperation with said seat axial cavity;

aspirator means extending through said seat for providing fluid communication between said seat axial cavity; and spring loaded tensioning means disposed in said central cavity abutting against said piston on the side opposite from said seat for adjustably providing a pressure against said piston to effect a displacement of said poppet from said seat.

8. In a valve block for an IS glassware forming machine including a plurality of output ports and means for coupling the output ports to an IS machine manifold said valve block being adapted for cooperation with at least one valve means for selectively effecting fluid communication between a first port and a second port thereof, and for selectively effecting fluid communication between said second port and a third port thereof, said manifold including inlet ports associated with respective machine elements, said ports being in predetermined relative spatial disposition, the improvement wherein;

said means for coupling the valve block output ports to the manifold comprises:

a plate having first and second principal surfaces, one principal surface being adapted to mate with said valve block, and the other principal surface being adapted to mate with said manifold;

apertures formed through said plate disposed at positions corresponding to the disposition of one of said manifold inlet ports and said valve block output ports; and channels formed on and extending along said plate first principal surface, disposed for coupling said aperture to one of an associated valve block ouput port and an associated manifold inlet port; and the further improvement wherein said valve block comprises:

a body;

first, and second plenums formed in said body, said first and second plenums being respectively coupled to fluid supplies at differing pressures;

a first fluid passageway formed in said body, communicating with said valve means first port;

a first fluid passageway formed in said body, communicating with said valve means second port and with one of said valve block output ports;

an exhaust means for exhausting said fluid communicating with said valve means third port; and selector means, disposed in said valve block, for selectively coupling said first or second plenums to said first fluid passageway.

9. In the valve block of claim 8, wherein said first and second principal surfaces are opposing surfaces, and said apertures consist essentially of substantially straight bores extending through said plate generally perpendicular to said first and second principal surfaces.

10. The valve block of claim 8 wherein said valve means comprises a solenoid operated valve.

11. A valve block assembly adapted for cooperation with a plurality of valve means, each valve means having an inlet port and an outlet port, said valve block assembly comprising a body, first and second plenums disposed in said body and respectively coupled to different fluid supplies, a fluid passageway connected to each inlet port of said valve means, selector means connected to said valve block assembly for selectively coupling said first or said second plenum to said first passageway, an output passageway disposed in said body and communicating between the output port of said valve means and a valve block output port, a kissplate having input ports leading to respective machine elements, means for coupling the valve block output port to said input ports, said coupling means comprising a plate having first and second principal surfaces, one principal surface being adapted to mate with said valve block assembly, and the other principal surface being adapted to mate with said kissplate, said plate having apertures through said plate and disposed at positions corresponding to the disposition of the input ports, and channels disposed in and extending along one principal surface, said channels coupling said apertures to associated input ports.

* * * * *